(12) United States Patent
Oi et al.

(10) Patent No.: US 7,897,540 B2
(45) Date of Patent: Mar. 1, 2011

(54) PROCESS FOR PRODUCING ACTIVATED CARBON

(75) Inventors: Tokio Oi, Kakegawa (JP); Hirokazu Aono, Kakegawa (JP); Takayuki Suzuki, Kakegawa (JP); Yuji Mochizuki, Kakegawa (JP)

(73) Assignee: Cataler Corporation, Shizuoka (JP)

( * ) Notice: Subject to any disclaimer, the term of this patent is extended or adjusted under 35 U.S.C. 154(b) by 875 days.

(21) Appl. No.: 10/771,380

(22) Filed: Feb. 5, 2004

(65) Prior Publication Data

US 2004/0166050 A1 Aug. 26, 2004

(30) Foreign Application Priority Data

Feb. 25, 2003 (JP) ............................. 2003-047329

(51) Int. Cl.
*C01B 31/08* (2006.01)
(52) U.S. Cl. .................... 502/418; 502/416; 95/147
(58) Field of Classification Search ............... 502/416, 502/418; 95/147
See application file for complete search history.

(56) References Cited

U.S. PATENT DOCUMENTS

| | | | | |
|---|---|---|---|---|
| 3,638,399 A | * | 2/1972 | Walker ......................... | 95/144 |
| 3,962,129 A | | 6/1976 | Munzner et al. | |
| 4,458,022 A | | 7/1984 | Ohsaki et al. | |
| 4,685,220 A | * | 8/1987 | Meenan et al. ............... | 588/320 |
| 5,204,310 A | | 4/1993 | Tolles et al. | |
| 5,260,047 A | * | 11/1993 | Berger ....................... | 423/245.1 |
| 5,466,645 A | * | 11/1995 | Hayden ....................... | 502/56 |
| 2005/0014642 A1 | * | 1/2005 | Oi et al. ...................... | 502/416 |

FOREIGN PATENT DOCUMENTS

| | | |
|---|---|---|
| EP | 0 557 208 A1 | 8/1993 |
| JP | B2 1-52324 | 1/1983 |
| JP | A 61-191510 | 8/1986 |
| JP | A 62-132543 | 6/1987 |
| JP | A 63-030308 | 2/1988 |
| JP | A 06-100309 | 4/1994 |
| JP | A 09-183605 | 7/1997 |
| JP | A 2000-313611 | 11/2000 |
| WO | WO 01/52981 A1 | 7/2001 |

OTHER PUBLICATIONS

Nakano et al., "Control of Micropores of Molecular Sieving Carbon by Impregnation of Hydrocarbons and Heat Treatment" Oct. 1987.*
Moore, S.V., et al. "The Preparation of Carbon Molecular Sieves by Pore Blocking." *Carbon*, vol. 15; pp. 177-180, (1977).
Hayashi, J., et al. "Production of Molecular Sieving Carbon from Phenol-Formaldehyde Resin by an Ester-Carbonization Method." *Carbon*, vol. 34, No. 2, pp. 273-281, (1996).

* cited by examiner

*Primary Examiner*—Stuart Hendrickson
(74) *Attorney, Agent, or Firm*—Oliff & Berridge, PLC

(57) ABSTRACT

A process for producing an activated carbon includes the step of adsorbing an organic compound onto an activated carbon comprising pores which exhibit a wide pore diameter distribution, thereby selectively closing smaller pores which have a small pore diameter. In accordance with the production process, it is possible to produce activated carbons which are good in terms of the adsorption-desorption characteristic.

15 Claims, 2 Drawing Sheets

PROCESS FOR PRODUCING ACTIVATED CARBON

BACKGROUND OF THE INVENTION

1. Field of the Invention

The present invention relates to a process for producing an activated carbon. More specifically, it relates to a process for producing an activated carbon, process which makes it possible to produce activated carbons whose smaller pores are closed selectively.

2. Description of the Related Art

Gasoline, an automotive fuel, is highly volatile so that it vaporizes in fuel tanks to turn into gasoline vapors when automobiles are driven or when they are parked under the scorching sun. The gasoline vapors are emitted into air eventually.

Accordingly, canisters are installed between fuel tanks and engines in order to inhibit the gasoline vapors from emitting to the outside of automobiles. The canisters adsorb the gasoline vapors with adsorbents.

Many canisters are provided with activated carbons as an adsorbent. In the canisters, the activated carbons adsorb the gasoline vapors which are generated in fuel tanks. The adsorbed gasoline vapors are desorbed or purged from the activated carbons as the revolving speed of engines increases. Then, the desorbed or purged gasoline vapors are introduced into exhaust pipes along with air which comes from the outside, and are burned therein.

Recently, it has been required for the canisters not only to adsorb the gasoline vapors in fuel tanks but also to adsorb gasoline vapors when gasoline is supplied. In other words, it has been required for the canisters to show furthermore improved gasoline-vapor adsorption performance.

Moreover, it has been required for the canisters to exhibit not only the adsorption performance but also proper desorption performance.

For example, when gasoline vapors are adsorbed onto conventional canisters and the adsorbed gasoline vapors are thereafter desorbed by means of air, the conventional canisters might suffer from the problem that the adsorbed gasoline vapors reside on activated carbons. When the gasoline vapors reside on activated carbons, the residual components desorb from the activated carbons as the daytime temperature increases, and have been emitted eventually to the outside of automobiles. In order to inhibit the residual components from leaking to the outside, various countermeasures, such as providing the conventional canisters with a sub-canister, have been taken, but have resulted in causing the other problem, the increment of cost involved.

In general, activated carbons have been produced by carbonizing raw materials followed by carrying out the activation. In the production of activated carbons, the activation is a process which develops pores and controls the pore diameter or opening diameter of the pores. It is required for activated carbons applied to canisters to have pores, which exhibit such a large pore diameter that falls in a range of from 20 to 50 Å (i.e., 2 to 5 nm), in order to adsorb and desorb gasoline vapors. Such large pores are made by advanced activation processes or chemical activation processes which are carried out under severe conditions than those of usual activation processes as disclosed in Japanese Unexamined Patent Publication (KOKAI) No. 2000-313,611, Japanese Examined Patent Publication (KOKOKU) No. 1-52,324 and Japanese Unexamined Patent Publication (KOKAI) No. 63-30,308, for instance.

When the advanced activation processes or chemical activation processes are carried out, it is possible to produce activated carbons provided with larger pores. However, such activated carbons have exhibited a broad pore diameter distribution. To put it differently, the activated carbons comprise a large number of smaller pores as well whose opening diameter or pore diameter is small. The aforementioned residual components reside in such smaller pores whose pore diameter is small. Since smaller pores whose pore diameter is small exhibit higher absorptivity than that of larger pores whose pore diameter is large, adsorbed components are less likely to desorb from smaller pores. That is, in canisters, adsorbed components, which cannot desorb from and have remained in smaller pores having a small pore diameter, have caused the leakage of gasoline vapors when the ambient temperature increases.

SUMMARY OF THE INVENTION

The present invention has been developed in view of the aforementioned circumstances. It is therefore an object of the present invention to provide a production process which makes it possible to produce activated carbons which are good in terms of the adsorption-desorption characteristic.

In order to achieve the above-described object, the present inventors studied activated carbons over and over again. As a result, they found out that residual components remaining on activated carbons are adsorbed in smaller pores whose opening diameter or pore diameter is small when activated carbons are used as an adsorbent. Therefore, when a production process is adapted to close smaller pores whose pore diameter is small, they discovered that it is possible to achieve the object. Thus, they completed the present invention.

A process according to the present invention is for producing an activated carbon, and comprises the step of:

adsorbing an organic compound onto an activated carbon comprising pores which exhibit a wide pore diameter distribution, thereby selectively closing smaller pores which have a small pore diameter.

In accordance with the present production process, smaller pores whose pore diameter or opening diameter is small can be closed selectively by adsorbing an organic compound onto activated carbons. Accordingly, it is possible to produce activated carbons which are good in terms of the adsorption-desorption characteristic. Consequently, in accordance with the present production process, it is possible to produce activated carbons for canisters which can reduce the leakage of gasoline vapors. Moreover, it is possible to produce activated carbons for canisters which do not require a sub-canister, because the resultant canisters can inhibit gasoline vapors from leaking.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
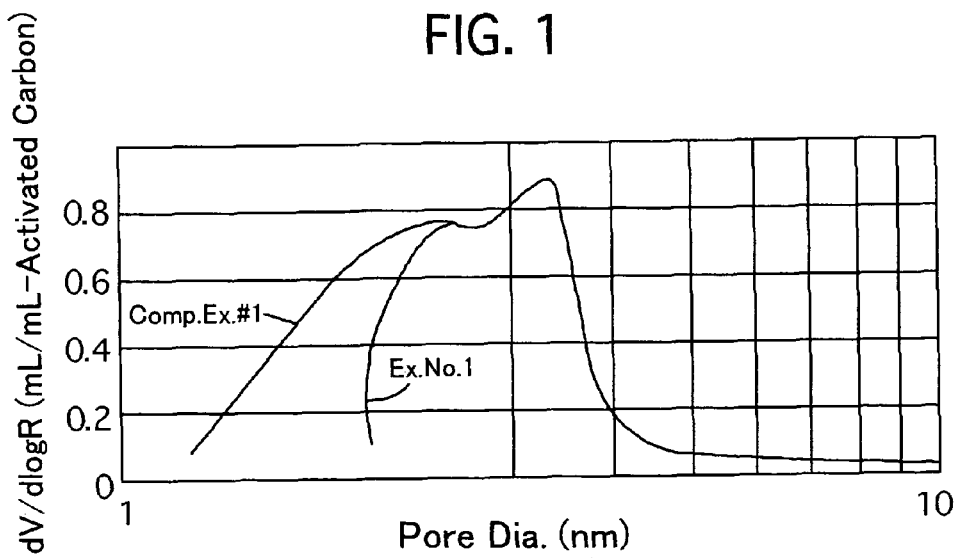
FIG. 1 is a diagram for illustrating the results of measurements on the pore diameter distribution of an activated carbon according to Example No. 1 of the present invention and an activated carbon according to Comparative Example No. 1 which were produced for canisters.

Having generally described the present invention, a further understanding can be obtained by reference to the specific preferred embodiments which are provided herein for the purpose of illustration only and not intended to limit the scope of the appended claims.

The present process for producing an activated carbon comprises a step of adsorbing an organic compound onto an activated carbon comprising pores which exhibit a wide pore diameter distribution, thereby selectively closing smaller pores which have a small pore diameter. In accordance with the present production process, among pores which exhibit a wide pore diameter distribution, only smaller pores which have a small pore diameter are closed selectively by adsorbing an organic compound onto an activated carbon. When the smaller pores which have a small diameter are closed, the resulting activated carbon exhibits a narrowed pore diameter distribution. Accordingly, the adsorption-desorption characteristic of the opening pores is uniformized. Consequently, the thus produced activated carbon exhibits a constant or stable adsorption-desorption characteristic. Note that a "wide pore diameter distribution" set forth in the present specification designates a pore diameter distribution ranging from 0.5 to 10 nm, preferably from 0.5 to 5 nm, further preferably from 1 to 3 nm. Moreover, a "small pore diameter" set forth in the present specification designates a pore diameter falling in a range of from 0.5 to 2 nm, preferably from 1 to 2 nm.

In addition, when smaller pores which have a small pore diameter or opening diameter are closed, components which have been adsorbed onto activated carbons are less likely to reside on the activated carbons when they are desorbed. In other words, when smaller pores which have a small pore diameter are closed, it implies that pores which exhibit a higher adsorption ability, or from which adsorbed components are less likely to desorb, come not to exist in activated carbons.

As a result, when activated carbons produced by the present production process are used as an adsorbent, it is possible to inhibit the drawbacks caused by residual components from occurring without impairing the inherent adsorption-desorption performance of the activated carbons.

In the present process for producing an activated carbon, an activated carbon to which an organic compound is adsorbed comprises pores which exhibit a wide pore diameter distribution. That is, an activated carbon to which an organic compound is adsorbed comprises a plurality of pores whose pore diameter or opening diameter differs with each other. Moreover, a "wide pore diameter distribution," exhibited by pores of an activated carbon to which an organic compound is adsorbed, specifies that the pore diameter distribution of the activated carbon is broadened to such an extent that the activated carbon can adsorb different components when it is used as an adsorbent.

In the present process for producing an activated carbon, as far as an activated carbon to which an organic compound is adsorbed comprises pores which exhibit a wide pore diameter distribution, the material quality is not limited in particular. For example, the activated carbon can be botanic activated carbons, mineral activated carbons and resinous activated carbons, but are not limited to them in particular. The botanic activated carbons can be wooden activated carbons, and activated carbons made of coconut husk. The mineral activated carbons can be activated carbons made of coal. The resinous activated carbons can be activated carbons made of phenolic resin. Moreover, the production process of the activated carbon to which an organic compound is adsorbed is not limited in particular. For instance, it is possible to subject activated carbons, which are produced by carbonizing raw materials followed by advanced activation processes or chemical activation processes, to the present production process.

In the present process for producing an activated carbon, it is preferred that the organic compound can be adsorbed onto the activated carbon in a heated state. When the organic compound is adsorbed onto the activated carbon in a heated state, the organic compound is likely to come into the pores of the activated carbon. Moreover, when decreasing the temperature of the activated carbon with the organic compound held in the pores, it is possible to make activated carbons whose smaller pores having a small pore diameter are closed.

It is not necessarily required to specify the heating temperature for adsorbing an organic compound onto the activated carbon. For example, it is preferable to determine the heating temperature so that activated carbons produced by the present production process can exhibit a pore diameter distribution which is required for specific applications. In general, when the heating temperature is controlled to be lower, it is possible to produce activated carbons which exhibit a narrowed pore diameter distribution. As a result, it is less likely that the adsorption-desorption characteristic of the respective pores of the resulting activated carbons fluctuates.

When an organic compound is adsorbed onto fully heated activated carbons, the organic compound comes into all of the pores of the activated carbons. However, the organic compound which comes into larger pores having a larger pore diameter does not reside in them but comes out to the outside of the larger pores, because larger pores having a larger pore diameter inherently exhibit a lower adsorption ability than smaller pores having a smaller pore diameter do. Thus, the organic compound is not adsorbed onto larger pores having a larger pore diameter, and accordingly larger pores having a larger pore diameter are not closed when the temperature of the activated carbons decreases. Here, note that the adsorption performance of porous substances depends on temperature. Therefore, when the heating temperature is varied, it is possible to select the pore diameter of pores to be closed. Hence, when the heating temperature is controlled, it is possible to control the pore diameter distribution of produced activated carbons. For example, the heating temperature can preferably fall in a range of from 100 to 500° C., further from 300 to 500° C., furthermore from 400 to 500° C.

In the present process for producing an activated carbon, it is preferred that the activated carbon can preferably be heated after the organic compound is adsorbed onto the activated carbon, thereby selectively leaving the organic compound only in the pores whose pore diameter falls in a predetermined range. When the activated carbon with the organic compound adsorbed in advance is heated, the organic compound comes out to the outside of the activated carbon through larger pores while it remains in smaller pores. Accordingly, when decreasing the temperature of the activated carbon, it is possible to make activated carbons whose smaller pores having a small pore diameter are closed. Note that the "predetermined range" herein designates a pore diameter range of from 0.5 to 2 nm, further from 1 to 2 nm.

It is not necessarily required to specify the temperature for heating the activated carbon with the organic compound adsorbed. For example, it is preferable to determine the heating temperature so that activated carbons produced by the present production process can exhibit a pore diameter distribution which is required for specific applications. As described above, the adsorption ability of pores is highly correlated with temperature. Therefore, when the heating temperature is controlled, it is possible to determine the pore diameter distribution of pores through which the organic compound comes out. Note that the higher the heating temperature is, the broader the pore diameter distribution of produced activated carbons is, because the organic compound is likely to come out through pores. Hence, when the heating temperature is controlled, it is possible to determine the pore diameter distribution of pores in which the organic compound resides.

Moreover, the activated carbon with the organic compound adsorbed can preferably be cooled in an inert gas atmosphere. When the activated carbon with the organic compound adsorbed is cooled in an inert gas atmosphere, it is possible to inhibit substances other than the organic compound from closing the pores of the activated carbon.

In addition, the organic compound can preferably be adsorbed onto the activated carbon after it is turned into a gaseous state. When the organic compound is turned into a gaseous state, the gaseous organic compound is likely to come into the pores of activated carbons. That is, the gaseous organic compound is likely to adsorb into the pores of activated carbons. Moreover, when the organic compound is turned into a gaseous state, the gaseous organic compound can come into all of the pores of activated carbons. Specifically, the organic compound can preferably exhibit a boiling point lower than the heating temperature. Especially, the organic compound can preferably comprise an organic compound whose boiling point is known. For instance, the organic compound can preferably exhibit a boiling point falling in a range of from 100 to 300° C., further from 150 to 300° C., furthermore from 200 to 250° C.

More particularly, the organic compound can preferably comprise an organic compound which smaller pores having a small pore diameter or opening diameter can adsorb. When the organic compound comprises such an organic compound, it is possible to produce activated carbons whose smaller pores having a small pore diameter are closed more selectively with ease. For example, such an organic compound can be naphthalene, naphthalene derivatives, and phenol.

The present process for producing an activated carbon can preferably be a process for producing an activated carbon for canisters. In accordance with the present production process, it is possible to produce activated carbons whose smaller pores having a small pore diameter are closed. To put it differently, activated carbons produced by the present production process exhibit a narrower pore diameter distribution than those of ordinary activated carbons. In other words, when activated carbons produced by the present production process are used as an adsorbent for canisters, it is possible to inhibit adsorbed components from leaking.

When producing an activated carbon for canisters, it is preferred that the organic compound, which selectively closes smaller pores having a smaller pore diameter, can be naphthalene ($C_{10}H_8$) whose boiling point is 218° C., for example, and that the pore diameter or opening diameter of smaller pores closed by the organic compound can be less than 20 Å (i.e., 2 nm), for instance.

An example of the present process for producing an activated carbon for canisters will be hereinafter described.

First, a raw activated carbon is produced by a conventionally known process, raw activated carbon which comprises pores having a larger pore diameter or opening diameter of from 20 to 50 Å. Then, naphthalene is adsorbed onto the raw activated carbon at a heating temperature of 250° C. or more. Finally, the naphthalene and raw activated carbon are cooled in an inert gas atmosphere.

In accordance with the above-described procedures, it is possible to produce an activated carbon for canisters.

Note that naphthalene is used as an organic compound in the aforementioned example of the present production process. However, instead of naphthalene itself, it is possible to use coal tar containing naphthalene. Even when coal tar is used as an organic compound, compounds whose boiling point is lower than that of naphthalene are evaporated by increasing the heating temperature after all of the components in the coal tar are adsorbed onto a raw activated carbon. Accordingly, only compounds in which naphthalene is included and whose boiling point is higher than that of naphthalene reside in the pores of the raw activated carbon. Consequently, the high boiling point compounds reside in the pores to close them. Since the compounds whose boiling point is higher than that of naphthalene are much less likely to desorb from activated carbons than naphthalene, they hardly affect the adsorption of ordinary gasoline vapors.

EXAMPLES

Hereinafter, the present invention will be described in more detail with reference to specific examples.

Activated carbons for canisters were produced as examples according to the present invention.

Note that a raw activated carbon for the activated carbons for canisters was produced in the following manner. Coal was pulverized to carry out forming, and the resulting green compact was thereafter carbonized. Subsequently, the carbonized green compact was subjected to a steam activation process to produce a raw activated carbon.

Example No. 1

The raw activated carbon and coal tar were prepared in a ratio of 1:0.2 by volume. Then, they were fully mixed.

Subsequently, a mixture of the raw activated carbon and coal tar was charged into an enclosable oven. The temperature of the oven was increased up to 450° C. for 1 hour in a nitrogen atmosphere. Thereafter, the oven was held at the temperature for 30 minutes.

After thus holding the oven at the temperature, a nitrogen gas was introduced into the oven. Then, the mixture of the raw activated carbon and coal tar was cooled in the inert gas atmosphere.

In accordance with the above-described procedures, an activated carbon according to Example No. 1 for canisters was produced.

Example No. 2

The raw activated carbon was filled into a column. The raw activated carbon was heated to 450° C. for 1 hour while flowing a nitrogen gas at a flow rate of 5 L/min. in the column. Thereafter, the raw activated carbon was held at the temperature for 30 minutes. When the raw activated carbon was thus held at the temperature, residual components, such as water in air, which had been adsorbed in the raw activated carbon, were removed.

Subsequently, gaseous coal tar fractions were flowed in the column while holding the temperature inside the column at 450° C. and flowing the nitrogen gas therein. Thus, a mixture gas of the gaseous coal tar fractions and nitrogen gas was flowed in the column. The gaseous coal tar fractions were flowed in the column for 1 hour. Note that the gaseous coal tar factions comprised components, such as anthracene, whose boiling point was higher than the coal tar used in Example No. 1, in addition to naphthalene. Moreover, the gaseous coal tar fractions occupied the mixture gas flowing into the column with a concentration of 50% by volume. In addition, the concentration of the respective gases, the gaseous coal tar fractions and the nitrogen gas, was adjusted by controlling the partial pressure of the respective gases.

After the flow of the gaseous coal tar fractions was terminated, the raw activated carbon was cooled while flowing the nitrogen gas in the column.

In accordance with the above-described procedures, an activated carbon according to Example No. 2 for canisters was produced.

Comparative Example No. 1

Comparative Example No. 1 was the raw activated carbon itself.

Comparative Example No. 2

Except that the raw activated carbon was heated at a temperature of 150° C., an activated carbon according to Comparative Example No. 2 for canisters was produced in the same manner as Example No. 1.

Comparative Example No. 3

Except that the raw activated carbon was heated at a temperature of 100° C., an activated carbon according to Comparative Example No. 3 for canisters was produced in the same manner as Example No. 1.

Comparative Example No. 4

First of all, the raw activated carbon was charged into an acetone solution, and was fully stirred therein. Thereafter, the resulting mixture was left to stand sill for 1 hour. Thus, acetone was adsorbed onto the raw activated carbon.

Subsequently, the raw activated carbon was removed from the acetone solution, and was charged into a heating oven. The temperature of the oven was increased up to 200° C. for 1 hour in air. Thereafter, the oven was held at the temperature for 30 minutes.

Finally, the raw activated carbon was cooled in air. Thus, an activated carbon according to Comparative Example No. 4 for canisters was produced.

Comparative Example No. 5

Except that the raw activated carbon was heated at a temperature of 80° C., an activated carbon according to Comparative Example No. 5 for canisters was produced in the same manner as Comparative Example No. 4.

Assessment

In order to assess the activated carbons according to Example Nos. 1 and 2 as well as Comparative Example Nos. 1 through 5, the pore diameter distribution of the respective activated carbons for canisters were examined. FIG. 1 illustrates the results of the examination on the pore diameter distribution of the activated carbons according to Example No. 1 and Comparative Example No. 1.

Note that the pore diameter distributions were examined by carrying out the $N_2$ adsorption method and the benzene adsorption method.

It is seen from FIG. 1 that most of the pores of the activated carbon according to Example No. 1 for canisters had a pore diameter which fell in a range of from 20 to 50 Å (i.e., from 2 to 5 nm). On the other hand, the pores of the activated carbon according to Comparative Example No. 1 for canisters had a pore diameter which fell in a range of from 10 to 50 Å (i.e., from 1 to 5 nm), and accordingly the pore diameter distribution extended over a broad range. Moreover, it is appreciated from FIG. 1 that the activated carbon according to Comparative Example No. 1 for canisters comprised smaller pores whose pore diameter was small.

Moreover, the activated carbon according to Example No. 1 for canisters was further heated up to 250° C., and volatile components evaporating from the activated carbon were analyzed. It was found out that the volatile components were components which had been closing the smaller pores of the activated carbon according to Example No. 1 for canisters, smaller pores whose pore diameter was smaller than 20 Å (i.e., 2 nm). It was possible to verify that the volatile components comprised naphthalene alone.

The volatile components were identified in the following manner. Specifically, the activated carbon according to Example No. 1 for canisters was heated up to 250° C. in an inert gas (e.g., a nitrogen gas). Volatile components evaporating from the activated carbon was separated qualitatively with a gas chromatography "GC-17A" which was made by SHIMAZU SEISAKUSHO Co., Ltd. In addition, the separated components were analyzed quantitatively with a mass spectrometer "SUN 200" which was made by NIHON DENSHI Co., Ltd. The separation with the gas chromatography was carried out in the following manner. For example, a capillary column was used. The activated carbon was heated from −30° C. to 270° C. for about 40 minutes. Thus, the volatile components were separated. Moreover, the quantitative analysis with the mass spectrometer was carried out while controlling the detector voltage at 330 V.

Figure 2:
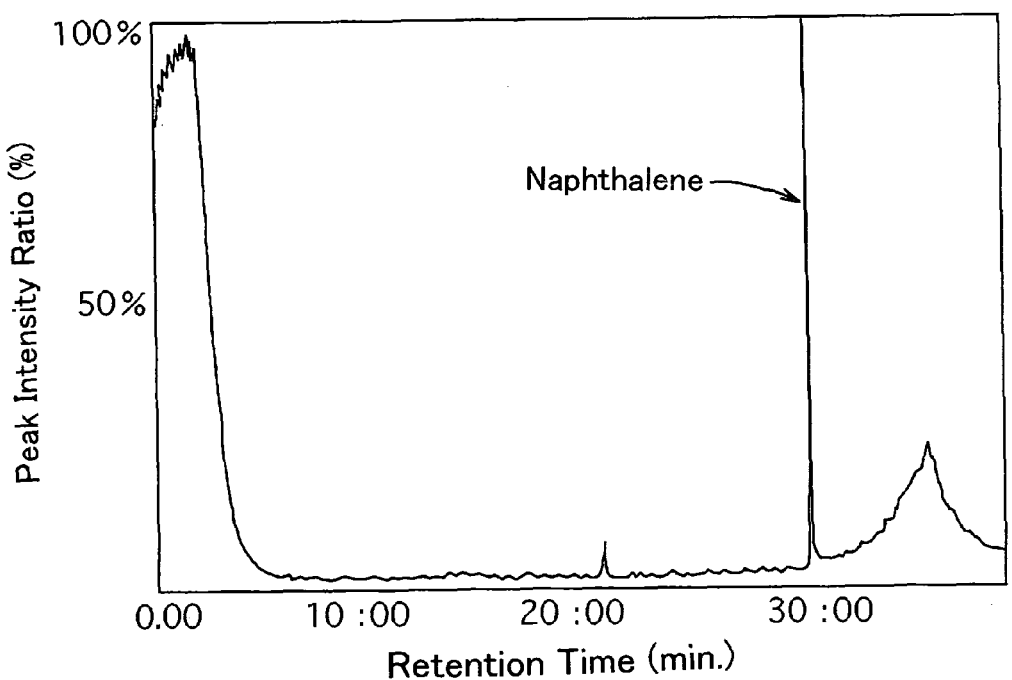
FIG. 2 is a diagram for illustrating the results of an analysis on residual components which were adsorbed onto the present activated carbon according to Example No. 1.

When the activated carbon according to Example No. 1 for canisters was subjected to the above-described examination with the gas chromatography, only a peak appeared at around a retention time of 30 minutes as illustrated in FIG. 2. That is, it is understood that one and only organic compound was adsorbed onto the activated carbon to close the smaller pores of the activated carbon whose pore diameter was small. As set forth above, it was verified with the mass spectrometer that the organic compound was identified as naphthalene in Example No. 1.

Moreover, the activated carbon according to Example No. 2 for canisters was likewise subjected to the above-described examination. The activated carbon produced the same results as those of the activated carbon according to Example No. 1, i.e., the smaller pores having a small pore diameter were closed by naphthalene.

When the pore diameter distribution of the activated carbons according Comparative Example Nos. 2 and 3 for canisters was examined, a result was obtained which indicated that the larger pores having a large pore diameter were closed. This is believed to result from the fact that the gaseous coal tar fractions were adsorbed onto the raw activated carbon at a lower heating temperature.

When the pore diameter distribution of the activated carbon according Comparative Example No. 4 for canisters was examined, a result was obtained which was virtually identical with that of Comparative Example No. 1. This is believed to result from the fact that the adsorbed acetone evaporated from the raw activated carbon when the raw activated carbon was heated at a temperature of 200° C.

When the pore diameter distribution of the activated carbon according Comparative Example No. 5 for canisters was examined, a result was obtained which was virtually identical with that of Comparative Example No. 4.

Figure 3:
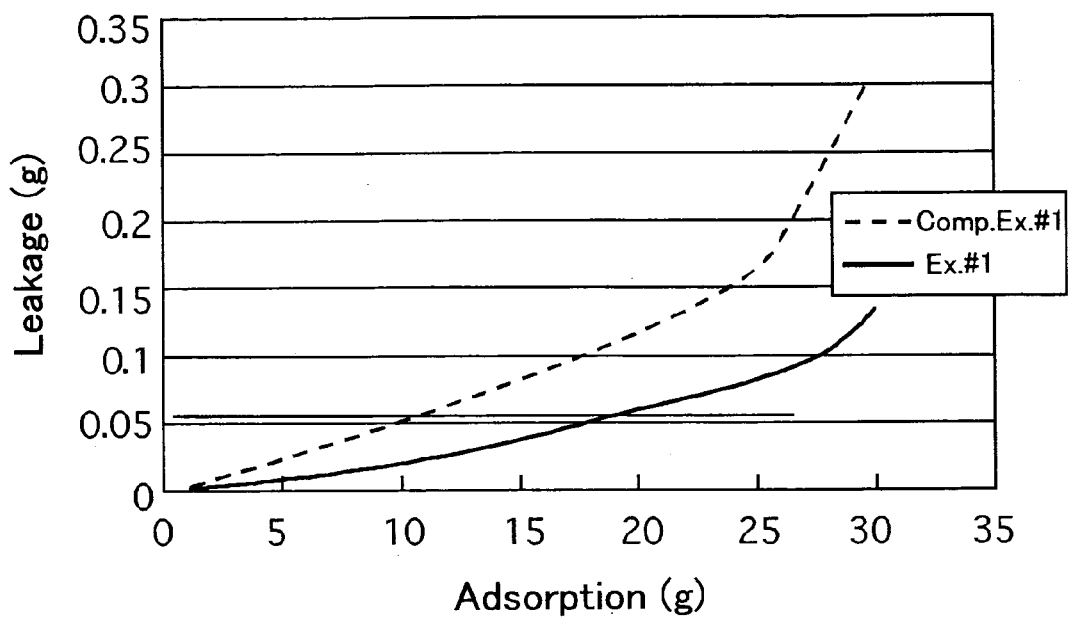
FIG. 3 is a diagram for illustrating the relationships between the adsorption and leakage of gasoline vapors which were exhibited by the present activated carbon according to Example No. 1 and the activated carbon according to Comparative Example No. 1.
Figure 4:
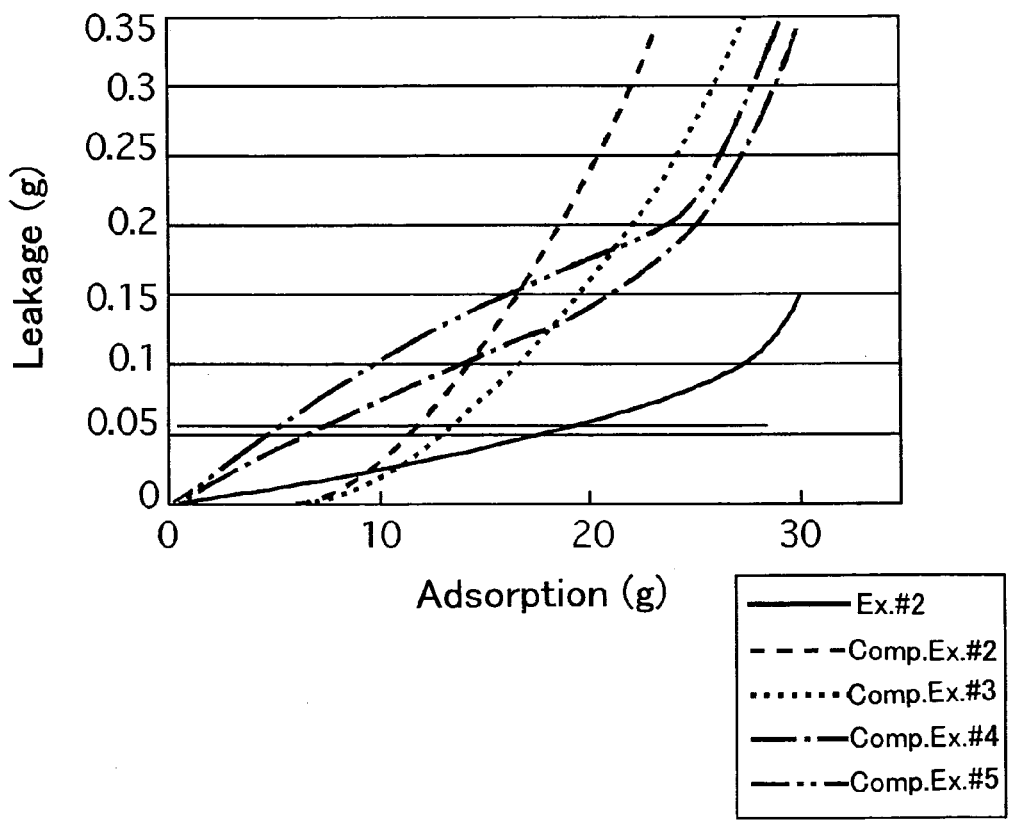
FIG. 4 is a diagram for illustrating the relationships between the adsorption and leakage of gasoline vapors which were exhibited by an activated carbon according to Example No. 2 of the present invention and activated carbons according to Comparative Example Nos. 2 through 5 which were produced for canisters.

Subsequently, the respective activated carbons for canisters were subjected to an adsorption-desorption test regarding gasoline vapors. After the adsorption-desorption test, they were measured for the leakage of gasoline vapors. FIGS. 3 and 4 illustrate the measurement results.

The specific procedures of the adsorption-leakage test were as hereinafter described. First, gasoline vapors were adsorbed onto the respective activated carbons and desorbed from them while the ambient temperature was kept at 25° C. Then, the activated carbons with the gasoline vapors desorbed were held in air for 1 hour. Thereafter, a 50% by volume butane gas was absorbed onto the activated carbons by a breakpoint of 2 g. Note that the balance of the butane gas was a nitrogen gas.

After the respective activated carbons were left as they were for 1 hour, adsorbed components were desorbed from them by purging them with air in a volume of 300 times of the activated carbons volume (i.e., 300 times of bed volume or "300 BV"). Then, the activated carbons were left as they were for one night, i.e., about 12 hours.

Finally, the respective activated carbons were measured for the leakage of adsorbed components which were desorbed from them when they were heated from 20° C. to 35° C. for 8 hours.

As illustrated in FIGS. 3 and 4, it is appreciated that the leakage of adsorbed components was reduced remarkably in the activated carbons according to Example Nos. 1 and 2 for canisters compared with the leakage which was exhibited by the activated carbons according to Comparative Example Nos. 1 through 5. Therefore, when an organic compound, such as naphthalene whose boiling point is 218° C., is adsorbed onto raw activated carbons under a heating condition, it is possible to turn raw activated carbons into activated carbons for canisters, activated carbons from which gasoline vapors are inhibited from leaking.

Having now fully described the present invention, it will be apparent to one of ordinary skill in the art that many changes and modifications can be made thereto without departing from the spirit or scope of the present invention as set forth herein including the appended claims.

What is claimed is:

1. A process for producing an activated carbon for canisters, comprising:
    adsorbing an organic compound onto an activated carbon by mixing the activated carbon and the organic compound in a liquid state to bring the organic compound into contact with surface pores of the activated carbon, the organic compound comprising coal tar and naphthalene; and
    desorbing the organic compound from the activated carbon with naphthalene advancing inside of the pores of the activated carbon by heating the organic compound and the activated carbon at a temperature higher than the boiling point of the organic compound to selectively close most of pores of the activated carbon with a diameter less than 20 Å, the temperature higher than the boiling point of the organic compound being controlled in a range of 500° C. or less.

2. The process set forth in claim 1, wherein the organic compound and activated carbon are heated while the organic compound adsorbs onto the activated carbon.

3. The process set forth in claim 1, wherein the activated carbon is heated after the organic compound is adsorbed onto the activated carbon, thereby selectively leaving the organic compound only in the pores whose pore diameter falls in a predetermined range.

4. The process set forth in claim 2 further comprising a step of cooling the activated carbon with the organic compound adsorbed in an inert gas atmosphere.

5. The process set forth in claim 3 further comprising a step of cooling the activated carbon with the organic compound adsorbed in an inert gas atmosphere.

6. A process for producing an activated carbon for canisters, comprising:
    adsorbing an organic compound onto an activated carbon by mixing the activated carbon and the organic compound in a liquid state to bring the organic compound into contact with surface pores of the activated carbon, the organic compound comprising coal tar and naphthalene; and
    desorbing the organic compound from the activated carbon with the naphthalene advancing inside of the pores of the activated carbon by heating the organic compound and the activated carbon at a temperature higher than the boiling point of the organic compound to selectively close pores of the activated carbon with a diameter less than 20 Å, the temperature higher than the boiling point of the organic compound being controlled in a range of 500° C. or less.

7. The process set forth in claim 6, wherein the organic compound and activated carbon are heated while the organic compound adsorbs onto the activated carbon.

8. The process set forth in claim 7 further comprising a step of cooling the activated carbon with the organic compound adsorbed in an inert gas atmosphere.

9. The process set forth in claim 6, wherein the activated carbon is heated after the organic compound is adsorbed onto the activated carbon, thereby selectively leaving the organic compound only in the pores whose pore diameter falls in a predetermined range.

10. The process set forth in claim 9 further comprising a step of cooling the activated carbon with the organic compound adsorbed in an inert gas atmosphere.

11. A process for producing an activated carbon for canisters, comprising:
    adsorbing an organic compound onto an activated carbon by mixing the activated carbon and the organic compound in a liquid state to bring the organic compound into contact with surface pores of the activated carbon, the organic compound comprising coal tar and naphthalene; and
    desorbing the organic compound from the activated carbon with the naphthalene advancing inside of the pores of the activated carbon by heating the organic compound and the activated carbon at a temperature higher than the boiling point of the organic compound to selectively close most of pores of the activated carbon with a diameter less than 20 Å, the temperature higher than the boiling point of the organic compound being controlled in a range of 500° C. or less.

12. The process set forth in claim 11, wherein the organic compound and activated carbon are heated while the organic compound adsorbs onto the activated carbon.

13. The process set forth in claim 12 further comprising a step of cooling the activated carbon with the organic compound adsorbed in an inert gas atmosphere.

14. The process set forth in claim 11, wherein the activated carbon is heated after the organic compound is adsorbed onto the activated carbon, thereby selectively leaving the organic compound only in the pores whose pore diameter falls in a predetermined range.

15. The process set forth in claim 14 further comprising a step of cooling the activated carbon with the organic compound adsorbed in an inert gas atmosphere.

* * * * *